Feb. 6, 1968   W. H. LAVERTY   3,367,426
POWER STAKE DRIVER
Filed Aug. 27, 1965   2 Sheets-Sheet 1

INVENTOR.
WAYNE H. LAVERTY
BY Bosworth, Sessions,
Herrstrom & Knowles
ATTORNEYS.

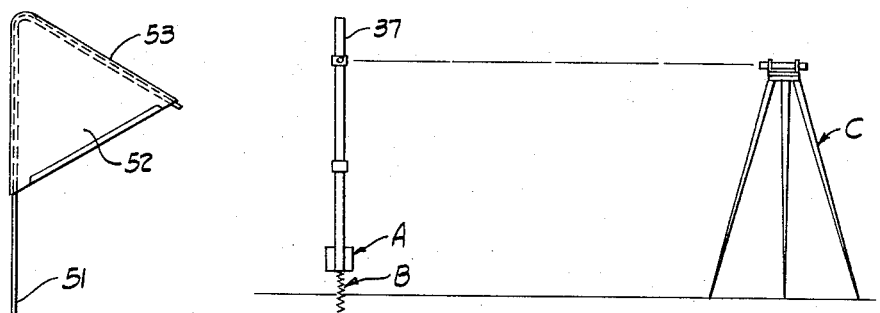
Fig. 6
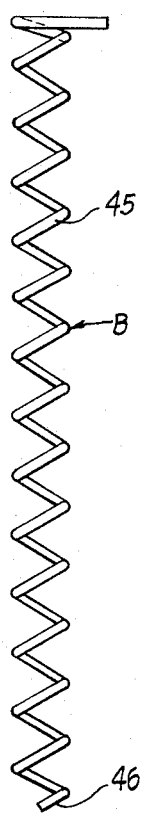
Fig. 7
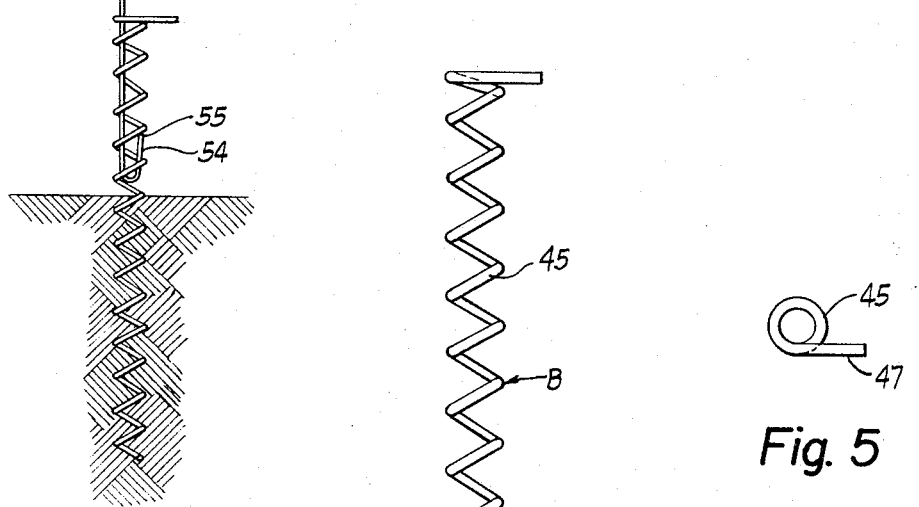
Fig. 5
Fig. 4
INVENTOR.
WAYNE H. LAVERTY

United States Patent Office 3,367,426
Patented Feb. 6, 1968

3,367,426
POWER STAKE DRIVER
Wayne H. Laverty, 30944 Lake Road,
Bay Village, Ohio 44140
Filed Aug. 27, 1965, Ser. No. 483,136
9 Claims. (Cl. 173—21)

ABSTRACT OF THE DISCLOSURE

Apparatus, and a method and a stake operable with the apparatus, for driving a stake to a predetermined level comprising a support, a rotatable member on the support that is positively rotated about an axis, means on the rotatable member for demountably engaging the top of a stake and for rotating the stake to drive it into the ground, means on the support for supporting a height-indicating member such as a level rod at essentially the same level as the top of the stake, and a guide member coaxial of the rotating member and having a lower portion that projects through the stake into the ground.

---

Figures 1, 2, 3:
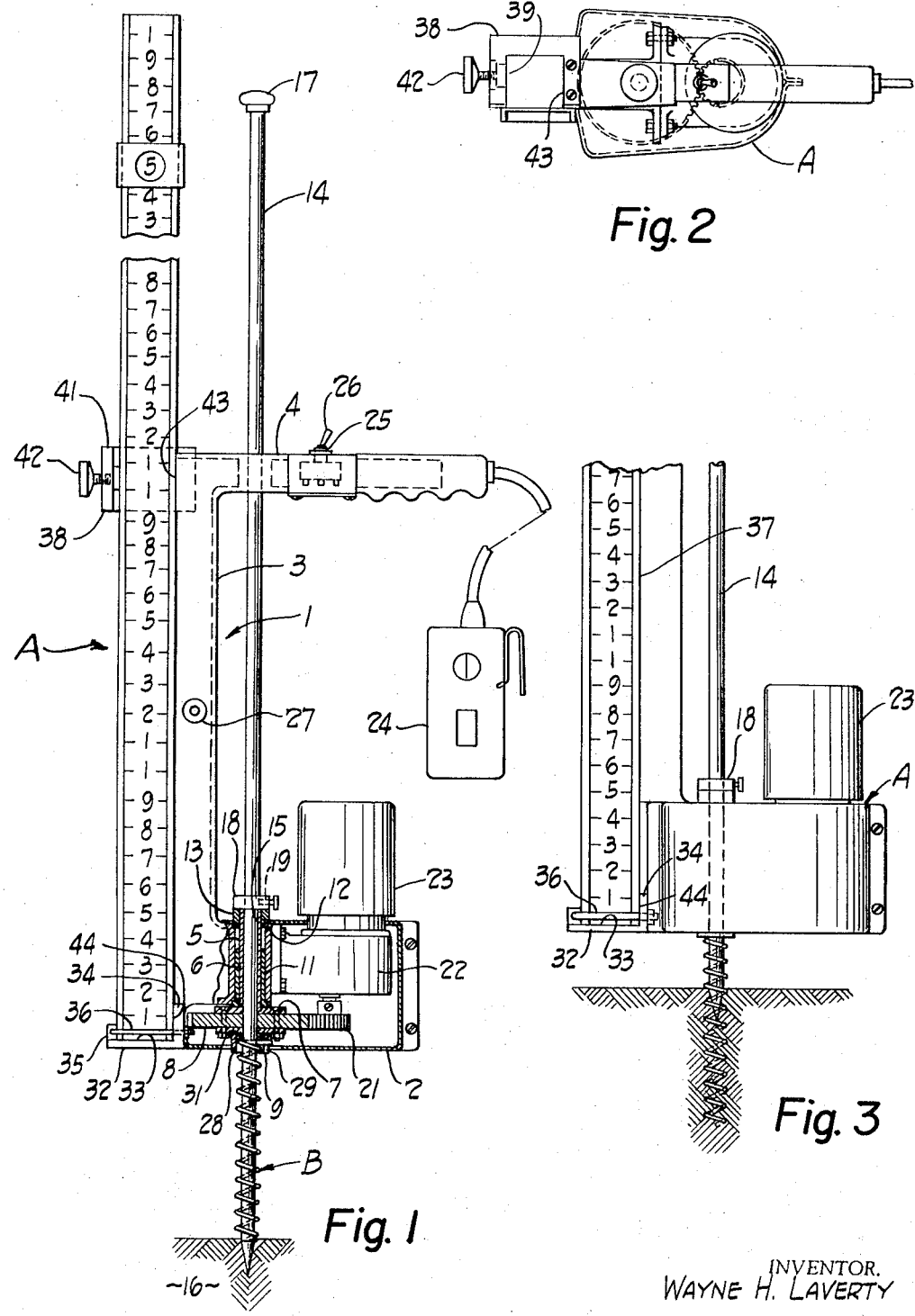

This invention relates to apparatus for driving a stake, to stakes adapted to be driven by such apparatus, and to marker means adapted to be associated with such stakes.

While the apparatus, and the devices of the invention, could be employed for other purposes, they provide particular advantages when employed to drive stakes to a desired level for construction purposes.

The usual practice of driving stakes to a predetermined level involves manually hammering a stake into the earth and periodically testing its elevation by resting the bottom of a level rod on the top of the stake and reading the elevation from a level measuring instrument, such as a surveyor's level or a transit. This is a time-consuming operation, since it usually involves hammering, then testing the level, rehammering or raising the stake if necessary, and so on. This is expensive also because of wage costs and possible construction delays.

Furthermore, the stakes, which are usually wooden stakes, are often pulled out of the earth by unauthorized persons, such as children at play. The stakes generally can be easily pulled out since they are usually smooth-sided pieces of wood that are driven into the ground. Furthermore, when it is necessary to mark the stakes, the markers, such as additional marked stakes, strips of cloth, flags or the like, are often removed by children or others. Such removal of stakes or markers often necessitates replacement of the stakes or markers and hence, additional work and delays that are expensive on a construction project.

It is an object of the invention to provide apparatus and devices which will overcome as many of these disadvantages as desired.

Another object is the provision of an apparatus for rapidly and accurately driving stakes.

Another object is the provision of such apparatus that supports the level rod when the stake is being driven so that the stake will be driven only to a predetermined level indicated by a reading on the level rod.

A further object is the provision of a stake, having a helical configuration, that can drive itself into the earth by being rotated, and that resists pulling out from the earth by children or others.

Another object of the invention is to provide a marker device adapted to cooperate with the stake of helical configuration in such manner that the marker device can be disengaged only with difficulty, thereby discouraging undesired removal thereof.

These and other objects of the invention will become apparent from the following description of a preferred embodiment thereof in connection with the accompanying drawings in which:

FIGURE 1 is a side elevation of the above device embodying an invention for driving a stake, showing a stake in place for driving, preparatory to driving of the stake;
FIGURE 2 is a plan of the apparatus of FIGURE 1;
FIGURE 3 is a side elevation of the lower portion of the apparatus of FIGURE 1, showing a stake being driven to a desired level;
FIGURE 4 is a side elevation of a stake embodying the invention;
FIGURE 5 is a plan of the stake of FIGURE 4;
FIGURE 6 is a view illustrating operation of the apparatus to drive a stake; and
FIGURE 7 is a view of a stake embodying the invention driven to the desired level and having mounted therein a signal flag embodying the invention.

Referring now to FIGURES 1, 2 and 3, the stake-driving apparatus A embodying the invention comprises a body 1 including a lateral portion 2, an upright portion 3 and an upper handle portion 4 that extends laterally over the lower portion 2. Body 1 advantageously may be made of cast or fabricated aluminum.

Lower portion 2 carries a rotatable member 5 comprising a sleeve portion 6 to which is fixed a lower driving portion 7 carrying a spur gear 8; the bottom of this driving portion carries stake-engaging means 9 to be described later. Rotatable member 5 is journaled in the lower portion 2 by lower sleeve bearing 11 and upper bearing 12. It is located against axial movement relative to the portion 2 by rotatable sliding contact of the driving portion 7 with the lower bearing 11 and by a collar 13 fixed to the upper end of sleeve portion 6 of rotatable member 5 and bearing against upper bearing 12. A shaft 14 passes through and slidably engages the opening 15 in rotatable member 5; the shaft can slide axially and rotationally relatively to the rotatable member, with which it is coaxial. This shaft extends upwardly through the handle portion 4; it has a pointed end 16 to aid its entry into the ground and a flat handle portion 17 facilitating manual pushing of the shaft into the ground if necessary. A collar 18 is adjustably fixed to the shaft by set screw 19 to determine the lower limit of travel of the shaft relative to the rotatable member 5.

The rotatable member 5 can be positively rotated by engagement of its gear 8 with a gear 21 mounted on the shaft of a reduction gear assembly 22 fixed to an electric motor 23 mounted on portion 2 of the body. The motor is energized by a suitable source of power, which is preferably a portable battery 24; the operation of the motor is controlled by a switch 25 of a type such that when its handle 26 is depressed the motor is energized, but when the handle is released it is moved by resilient biasing means to deenergize the motor. A reversing switch 27 is preferably provided to reverse the direction of rotation of the motor to permit unscrewing of the stake from the earth if it is desired tor aise its elevation or to remove it.

The stake-engaging means 9 in the illustrated embodiment comprises a cup-shaped portion 28 that is fixed to the rotatable member and has a slot 29 in its wall to engage a transversely-extending portion of the stake. This stake-engaging means also includes a magnetized base portion 31 that demountably holds in place the stake B which is preferably formed of steel.

The lower portion 2 of body 1 also carries a laterally-extending shelf or bracket 32 having a floor 33 that is so located that it essentially lies in a plane normal to the axis of rotation of the rotatable member 5, in which plane is located the surface of the base 31 of the cup-shaped portion against which surface the top of the stake B bears. The bracket 32 has shoulder portions 34 and 35 and cross members 36 which serve to locate against transverse movement the bottom of a conventional level rod 37.

The upper portion of the body 1 carries a clamping member 38 (FIGURES 1 and 2) defining the U-shaped opening 39 adapted to receive the level rod 37. The clamping member 38 in its outermost leg 41 carries a threaded member 42 that can exert pressure on the side of the level rod to clamp it against the surface 43 of the clamping member 38. This surface 43 of the clamping member is aligned with the surface 44 of the lower bracket 32 so that when the level rod is clamped in place it is essentially parallel to the axis of rotation of member 5.

The stake B of the invention is a helical member preferably formed of stiff steel wire formed into a helix of numerous identical turns 45 defining an internal space permitting the turns to closely but loosely surround the shaft 14; the turns are uniformly widely spaced by a distance that facilitates threading of the turns into the earth when the stake is rotated; the round cross section of the wire also facilitates threading. Although the lower end 46 of the stake may be sharpened, it usually is not necessary for ease of penetration; the upper end of the stake has a laterally-extending portion 47 for engaging the slot 29 of the rotatable member. The metal of which the stake is formed is stiff enough so that the stake does not deform substantially when the stake is rotated from only its upper end. The extension of the lower end of shaft 14 inside the stake also aids in preventing lateral deformation of the stake. Stakes embodying the invention can be made of various convenient lengths for various uses and conditions.

FIGURE 6 illustrates a method of operating the stake-driving apparatus A. A stake B is selected of a length that will provide the desired firm grip when driven into the earth and the desired degree of projectiton above the earth. The amount that the shaft 14 projects below lower portion 2 is adjusted, if necessary, to permit the pointed end 16 of the shaft to project sufficiently beyond the stake surrounding the shaft to permit end 16 to penetrate the earth to locate and guide the stake, as shown in FIGURE 1. Before or after such adjustment the stake B is slid over the lower portion of the shaft 14 and the upper end of the stake is demountably engaged by the stake-engaging means 9 of member 5, with the laterally-extending member 47 of the stake fitting in the slot 29 of the engaging means and the top of the stake seating in the cup of the engaging means and being supported there by the magnetized base 31. The level rod 37 can then be clamped on the apparatus with its lower end resting on the floor 33 of the bracket 32. The preferred practice is to have the level rod clamped in place in the body 1 at all times while the apparatus is in use.

The switch 27 having been moved to its proper actuating position, the apparatus as a whole is manually located over the position where the stake is to be driven with the point of the shaft 14 in the earth; and the apparatus, the level rod and the leveling instrument C are adjusted so that the leveling instrument is sighted on the vertical level rod. The handle 26 of the control switch 25 is then moved to start the motor which positively rotates the rotatable member 5 causing the stake B to thread itself into the earth while it is guided by the shaft 14. It is merely necessary to insert the pointed end 16 of the shaft into the earth; depending on the texture of the earth, the shaft may or may not travel deeper than its initial penetration as the stake penetrates the earth; in any event the stake is guided by the shaft.

The stake is permitted to thread itself into the earth, causing the body portion of the apparatus to lower until the operator at the leveling instrument C signals the operator of the stake-driving apparatus that the proper level has been reached by his reading of the level rod, whereupon the apparatus operator releases the switch handle 26 to stop the motor and halt driving of the stake B. If the stake has been driven too deeply it can be raised the proper amount by causing the motor to rotate in the opposite direction by suitable actuation of switches 27 and 25. The proper level of the top of the stake is thus readily determined since the bottom of the level rod is essentially in the same horizontal plane as the top of the stake. The apparatus A is then merely lifted off the stake, which remains embedded in the earth with its top at the proper level.

If it is desired to mount a marker on the stake, the marker shown in FIGURE 7 is advantageous. This marker comprises a shaft portion 51, preferably formed of a stiff piece of wire, having permanently affixed thereto a marking portion 52 of suitably colored material. In the illustrated embodiment, the upper end 53 of the wire forming the shaft 51 is bent at an angle as shown and the marking portion takes the form of a preformed sleeve or bag of colored plastic sheet or fabric that is heat-sealed in place so that it cannot be removed from the wire. The marking portion of course can be made of other sheet material or design.

The lower portion 54 of the wire 51 is bent upwardly as shown, so that the lateral distance between the outermost portions of the free end 55 of the wire and the shaft is somewhat greater than the inner diameter of the wire turns, so that when the wire is inserted into the threaded end of the stake, either by rotation of the marker shaft or by pushing it downwardly as a possible due to the resilience of portion 54, the free end 55 of the wire, due to the resilience of the wire, engages one of the helical turns of the stake. The marker, therefore, cannot be removed except by twisting it to unscrew it from the stake. This is difficult because of the friction between the hook-shaped end of the marker and the stake, which is accentuated by the resilience of the wire. The difficulty of removing or destroying the marker is enough to discourage children or others who might desire to tamper with or remove the marker.

Both the stakes and markers of the invention can be made so inexpensively that they can be discarded after use, as by plowing them under or otherwise disposing of them in course of the work.

The invention thus provides apparatus and devices permitting the rapid and accurate driving of stakes with little physical effort, and also providing types of stakes and the markers therefor which will discourage or prevent undesired removal thereof once the stakes have been driven. It is apparent that various modifications other than those indicated may be made in the apparatus and devices disclosed herein without departing from the spirit of the invention.

It is intended that the patent shall cover, by suitable expression in the appended claims, whatever features of patentable novelty reside in the invention.

What is claimed is:

1. Apparatus for driving a stake to a predetermined level, comprising a support, a member mounted on said support for rotation about an axis, means for positively rotating said member about said axis, means on said rotatable member for demountably engaging the top of a stake to be driven and for rotating said stake essentially about said axis as said rotatable member is rotated, and a guide member disposed coaxially of said rotating member and having a lower portion adapted to project through the stake and into the ground.

2. Apparatus for driving a stake to a predetermined level comprising a support, a member mounted on said support for rotation about an axis, means for positively rotating said member about said axis, means on said rotatable member for demountably engaging the top of a stake to be driven and for rotating said stake essentially about said axis as said rotatable member is rotated, and means on said support for supporting the bottom of a height-indicating member essentially in a plane that is normal to said axis of rotation and contains the top of said stake that is being driven.

3. Apparatus for driving a stake to a predetermined level comprising a support, a member mounted on said support for rotation about an axis, means for positively rotating said member about said axis, means including magnetic means on said rotatable member for demountably engaging the top of a stake to be driven to support said stake before it is engaged with the material into which it is to be driven and for rotating said stake essentially about said axis as said rotatable member is rotated, and means on said support for supporting the bottom of a height-indicating member at essentially the same level as the top of said stake when said axis of rotation is essentially vertical.

4. Apparatus for driving a stake to a predetermined level comprising a support, a member mounted on said support for rotation about an axis, means for positively rotating said member about said axis, means on said rotatable member for demountably engaging the top of a stake to be driven to support said stake before it is engaged with the material into which it is to be driven and for rotating said stake essentially about said axis as said rotatable member is rotated, and means on said support for supporting the bottom of a height-indicating member essentially in a plane that is normal to said axis of rotation and contains the top of said stake that is being driven.

5. Apparatus for driving a stake to a predetermined level comprising a support, a member mounted on said support for rotation about an axis, means for positively rotating said member about said axis, means on said rotatable member for demountably engaging the top of a stake to be driven and for rotating said stake essentially about said axis as said rotatable member is rotated, means on said support for supporting a height-indicating member, and a guide member disposed coaxially of said rotating member and having a lower portion adapted to project through the stake and into the ground.

6. Apparatus for driving a stake to a predetermined level comprising a support, a member mounted on said support for rotation about an axis, means for positively rotating said member about said axis, means on said rotatable member for demountably engaging the top of a stake to be driven and for rotating said stake essentially about said axis as said rotatable member is rotated, means on said support for supporting the bottom of a height-indicating member essentially in a plane that is normal to said axis of rotation and contains the top of said stake that is being driven, and a guide member slidably mounted coaxially of said rotating member and having a lower portion adapted to project through the stake and into the ground.

7. Apparatus for driving a stake to a predetermined level comprising a body having a lower transverse portion, an upper transverse portion spaced from and overlying said lower transverse portion, and an upright portion connecting said lower and upper transverse portions; a member mounted on said lower transverse portion for rotation about an axis that extends through both said transverse portions; means carried by said body for positively rotating said member about said axis; means on said rotatable member for demountably engaging the top of a stake to be driven to support said stake before it contacts the material into which it is to be driven and to rotate said stake essentially about said axis as said rotatable member is rotated; means on said support for supporting the bottom of a level rod essentially in a plane that is normal to said axis of rotation and contains the top of said stake; and a guide shaft that is slidably mounted on said rotatable member coaxially thereof and has an upper portion extending above said upper transverse portion and a lower portion extending below said lower transverse portion and adapted to project through said stake.

8. The apparatus of claim 7 in which the distance that the lower portion of said guide shaft projects below the lower transverse portion of said body is adjustable.

9. The apparatus of claim 7 in which said means for positively rotating said rotatable member is an electric motor, and in which there is a switch on said upper transverse member for controlling the operation of said motor.

References Cited

UNITED STATES PATENTS

| | | | |
|---|---|---|---|
| 1,849,903 | 3/1932 | Blackwell | 173—21 X |
| 1,951,192 | 3/1934 | Hantijopoulos | 173—21 X |
| 2,658,725 | 11/1953 | Arps | 173—121 X |
| 3,032,126 | 5/1962 | Rexine | 173—163 X |
| 3,148,739 | 9/1964 | Mattingly et al. | 173—46 |

FOREIGN PATENTS 533,086  11/1954  Belgium.

FRED C. MATTERN, JR., *Primary Examiner.*

L. P. KESSLER, *Assistant Examiner.*